United States Patent [19]

Miller

[11] Patent Number: 5,325,742
[45] Date of Patent: Jul. 5, 1994

[54] HYDRAULIC TORQUE WRENCH DRIVE SHAFT RETAINER

[75] Inventor: Douglas P. Miller, New Berlin, Wis.

[73] Assignee: Applied Power Inc., Butler, Wis.

[21] Appl. No.: 72,620

[22] Filed: Jun. 4, 1993

[51] Int. Cl.⁵ .................................. B25B 13/06
[52] U.S. Cl. ............................ 81/57.44; 81/57.39
[58] Field of Search ............... 81/57.44, 57.39, 467, 81/469–470, 54, 57, 57.42, 57.45

[56] References Cited

U.S. PATENT DOCUMENTS

| | | | |
|---|---|---|---|
| 4,513,645 | 4/1985 | Graborac et al. | 81/57.39 |
| 4,794,825 | 1/1989 | Schmoyer | 81/57.39 |
| 4,987,802 | 1/1991 | Chern | 81/57.39 |
| 5,140,874 | 9/1992 | Junkers | 81/57.39 |

OTHER PUBLICATIONS

"Enerpac Plarad Power Wrench Torque Wrench System", Catalog #9193, Applied Power Inc., 1992.

*Primary Examiner*—D. S. Meislin
*Attorney, Agent, or Firm*—Quarles & Brady

[57] ABSTRACT

A retainer for the drive shaft of a hydraulic torque wrench has an eccentric pivotably connected to the free end of the shaft which can be pivoted between an unlocked position and one or more locked positions and locked in any of the positions with a plunger. In the unlocked position, the eccentric does not overlap a bearing of the wrench so that the shaft and eccentric can be withdrawn axially from the wrench drive head. In the locked position(s), the eccentric overlaps and abuts an axial face of the bearing so that the eccentric cannot be drawn into the bearing, thereby securing the shaft against axial movement out of the wrench drive head in the direction from the eccentric toward the bearing.

11 Claims, 3 Drawing Sheets

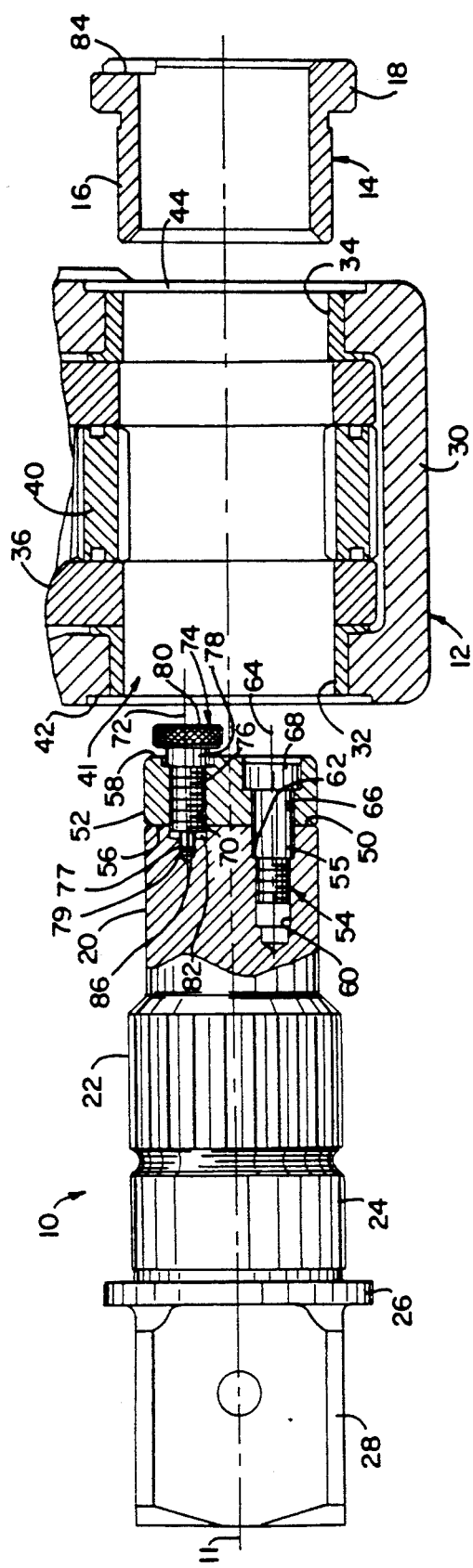

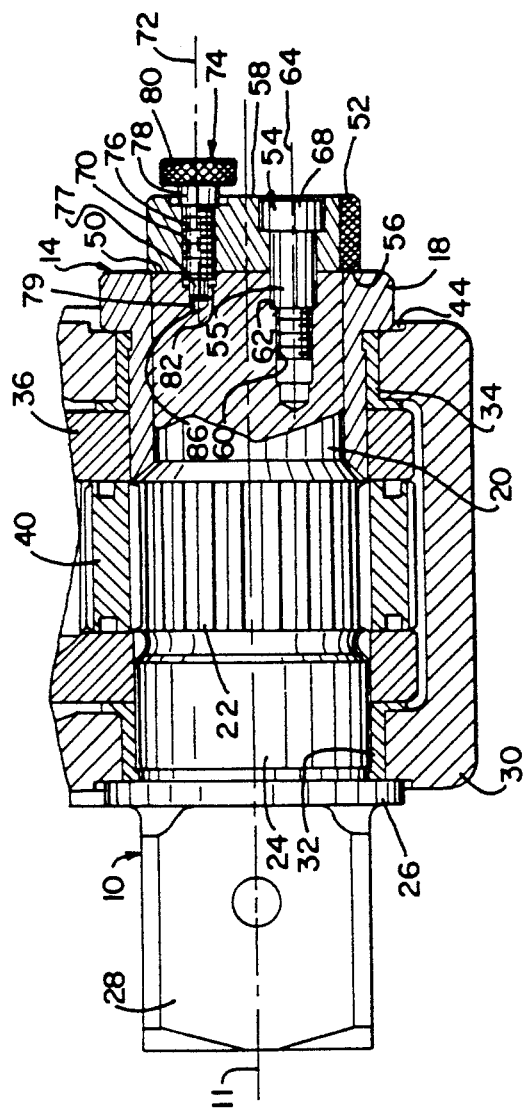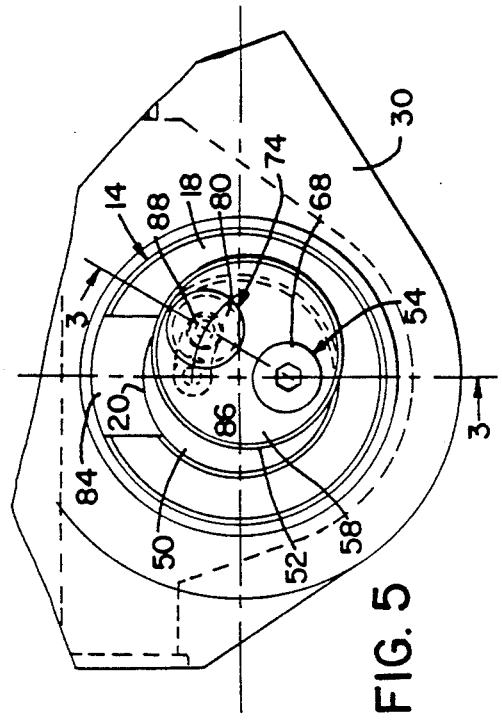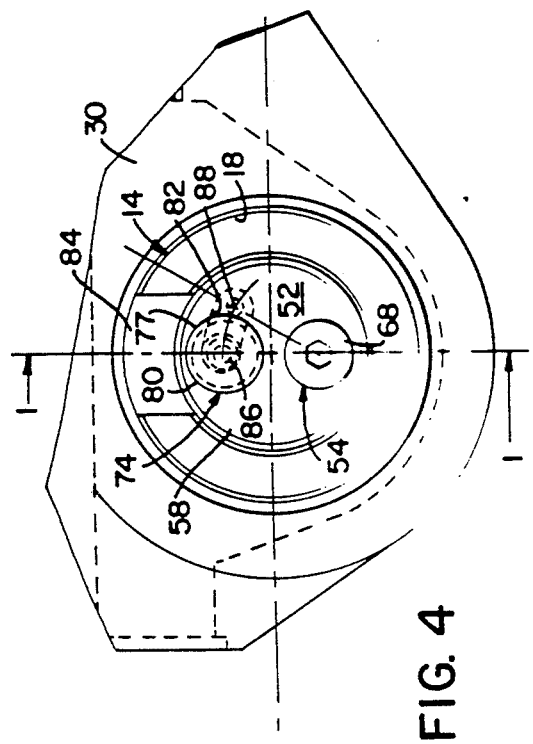

HYDRAULIC TORQUE WRENCH DRIVE SHAFT RETAINER

FIELD OF THE INVENTION

This invention relates to a device for retaining a drive shaft of a hydraulic torque wrench so that the drive shaft is fixed axially to the torque wrench drive head but removable to reverse the direction of the drive shaft.

DISCUSSION OF THE PRIOR ART

Hydraulic torque wrenches are well known and typically include a drive head having a hydraulic cylinder for driving a drive shaft rotatably with a rack and pinion type linkage. The drive mechanism of the wrench head is typically driven in only one direction. The torque wrench drive shaft has a splined connection with the drive head so that the drive shaft can be inserted from either side of the head so as to reverse the fastener driving direction.

Typically, the free end of the drive shaft (i.e., the end of the shaft opposite from the drive adapter end) is smaller in diameter than the spline provided on the drive shaft. The spline on the shaft is usually positioned axially between the smaller journalled land at the free end and a larger diameter journalled land adjacent to the drive adapter. A removable bearing, usually a bushing, is provided which journals the smaller diameter free end of the drive shaft and has an outside diameter approximately equal to the larger diameter land adjacent to the drive adapter end. With this arrangement, the bearing can be inserted into either side of the drive head so that the drive shaft may be inserted from either side of the drive head, depending upon the fastener drive direction desired, i.e., tightening or loosening.

Drive shafts of this type were typically retained by machining a circumferential groove into the free end of the drive shaft just outside of the removable bushing and installing a conventional snap ring into the groove to bear against the axially facing surface of the bearing so as to prevent the drive shaft from being withdrawn from the bearing. With this arrangement, a special tool was needed to install or remove the spring clip and also, unless extreme care was practiced, the spring clips were easily lost in the installation or removal process as they had a tendency to zing away, or be damaged by excessive opening during removal or installation.

To overcome this problem, the prior art in some instances has attached a chain between the spring clip and the shaft to keep from losing the spring clip, although this solution is not acceptable since the chain is undesirably loose and dangling. Also, the spring clips if not properly seated in the groove, can come off in operation.

SUMMARY OF THE INVENTION

The invention provides a retainer for the drive shaft of a hydraulic torque wrench in which there are no loose parts, no tools are necessary to assemble the shaft to the drive head, and the shaft can be assembled or removed from the drive head quickly and easily. The invention also provides a retainer which positively locks the shaft to the drive head and provides a good tactile feel to confirm engagement. A retainer of the invention can also be made to help position and guide the drive shaft in the drive head upon insertion.

The invention provides a shaft retainer for a hydraulic torque wrench of the type having a bearing coaxial with and journalling a free end of the shaft with the shaft having an axially facing end-face adjacent to the bearing. An eccentric is provided which has a bearing end surface in facing abutment with the end face of the shaft and a free end surface on the opposite side of the eccentric from the bearing end surface. The eccentric has pivot and plunger axes which are parallel to the shaft axis and the pivot axis is spaced apart from the shaft axis. A plunger is secured to the eccentric co-axial with the plunger axis and extends beyond the bearing and free end surfaces of the eccentric from a locking end which is beyond the bearing end surface to an operator end which is beyond the free end. A pivot pin has an axis co-axial with the pivot axis which pivotally connects the shaft and the eccentric so that the eccentric is axially fixed to the shaft and rotatable between a locked position in which the eccentric bearing surface extends beyond an edge of the shaft end face and overlaps the bearing and an unlocked position in which the eccentric does not overlap the bearing. The shaft has at least one axially facing hole in the end face into which the plunger locking end can be engaged in the locked position of the eccentric, the plunger being releasable so as to rotate the eccentric to the unlocked position so that the eccentric can be drawn axially into the bearing. Thereby, no tools are needed to lock the shaft to the torque wrench drive head, there are no loose parts needed to secure the shaft and drive head together, and the engagement of the plunger in the hole positively secures the eccentric in the locked position.

Preferably, the eccentric has a circular outer periphery which is approximately equal to or less than the diameter of the free end of the shaft, to help guide the shaft through the drive bore as it is being inserted. Preferably, the outer periphery of the eccentric has a knurled surface for gripping by the operator.

In another useful aspect, the end face of the shaft has a second axially facing hole formed therein in which the locking end of the plunger engages in the unlocked position of the eccentric. This secures the eccentric in the unlocked position to help it guide the shaft through the drive bore upon insertion.

In another useful aspect, a kidney shaped slot is formed in the end face of the shaft and the ends of the kidney shaped slot act as pivot stops to limit the rotary movement of the eccentric relative to the shaft. This can be accomplished by extending a housing of the plunger into the slot, with the extending end of the housing abutting against the ends of the slot to limit the pivoting of the eccentric. In this aspect, the axially facing holes in the end face which are engaged in the locked and unlocked positions preferably opens into a bottom wall of the kidney shaped slot so as to be engaged by the end of the plunger.

Other features and advantages of the invention will be apparent from the drawings and from the detailed description of the preferred embodiments.

BRIEF DESCRIPTION OF THE DRAWINGS

FIG. 1 is an exploded elevation view partially in section as viewed along the line 1—1 of FIG. 4 of a portion of a hydraulic torque wrench drive head, a removable bearing and a drive shaft incorporating a retainer of the invention;

FIG. 2 is a view similar to FIG. 1 but showing the drive shaft inserted into the drive head;

FIG. 3 is a sectional view as viewed along the line 3—3 of FIG. 5 showing the drive shaft fully engaged in the drive head;

FIG. 4 is an end elevation view showing the retainer in an unlocked position;

FIG. 5 is an end elevation view showing the retainer in a locked position;

DETAILED DESCRIPTION OF THE PREFERRED EMBODIMENTS

Figure 6:
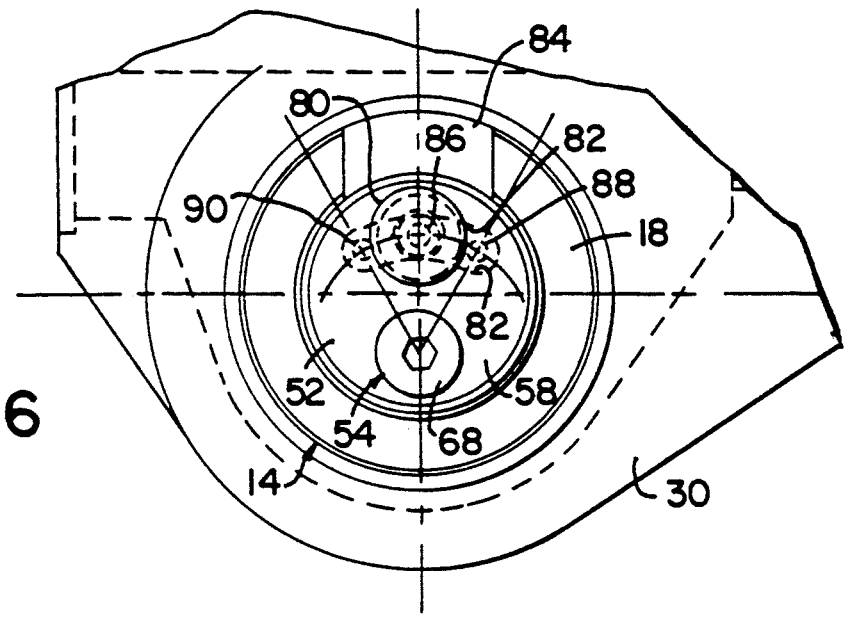
FIG. 6 is a view similar to FIG. 4 but showing an alternate embodiment in which an eccentric of the retainer may be pivoted to either of two locked positions, shown in phantom, on either side of an unlocked position.

Referring to FIG. 1, a drive shaft 10 having an axis 11 is shown incorporating a retainer of the invention. Also illustrated is a portion of a drive head 12 shown in section and a removable bearing 14. In the preferred embodiment, the bearing 14 is a bushing having a shank 16 and a flange 18. The bearing 14 journals free end land 20 of shaft 10 which is of a smaller diameter than spline 22 and drive end land 24. Adjacent to land 24 is a flange 26 of the shaft 10 and a drive adaptor 28 extends from the flange 26. The drive adaptor 28 interfaces with a tool (e.g., a socket) a nut or a bolt to be driven. As shown, the drive adaptor 28 is a square drive, although it should be understood that it could be any other type of drive such as a cap screw drive or a socket drive.

The drive head 12 has a housing 30, side bushings 32 and 34, a yoke 36 and a drive gear 40 between the arms of the yoke 36. The drive gear 40 is internally splined to mate in driving engagement with the external spline 22 of shaft 10. The drive gear 40 is rotated by the drive head 12 in any suitable manner to drive the shaft 10. In the particular embodiment illustrated, the yoke 36 is rotated by the drive head to rotate the drive gear 40, although any suitable mechanism could be employed to practice the invention. The drive head 12 may be any suitable drive head, such as a hydraulic torque wrench drive head available from Enerpac, a division of Applied Power, Inc., under the commercial designation Plarad TM, the LT System TM, which is the drive head depicted in the drawings.

The shaft 10 may be inserted into the drive bore 41 of the drive head 12 from either side. If it is inserted into the left side (as shown in FIG. 1) so that it first enters side bushing 32, the shaft 10 will be driven in one rotary direction, for example to tighten a bolt. If the shaft 10 is inserted into the opposite side of the drive head 12, so that its free end is first inserted through drive bushing 34, the drive shaft 10 will be driven in the opposite direction, for example, to loosen the bolt. Therefore, it is necessary to occasionally remove the shaft 10 from the drive bore 41 and reassemble it from the opposite side of the drive bore so as to reverse the fastener drive direction.

To make axial insertion and removal possible, the free end land 20 is of a smaller diameter than the spline 22 and land 24. Bushings 32 and 34 are the same internal diameter. If the shaft 10 is inserted from the left as shown in FIG. 1, then bushing 32 journals land 24 (as shown in FIGS. 2 and 3) with spline 22 engaged in drive gear 40. Bearing 14 is then inserted over free end 20 and is itself journalled by side bushing 34. If the shaft 10 is inserted from the right (so that its free end first enters the side bushing 34) then land 24 would be journalled by side bushing 34 and bearing 14 would be inserted from the other side so that it would be journalled by side bushing 32. Both the flange 26 of shaft 10 and the flange 18 of bearing 14 are received in recesses 42 and 44 at the opposite sides of the drive bore 41. Both flanges 18 and 26 bear axially against their adjacent bushings 32 or 34 to prevent axial movement of the shaft 10 out of the bore 41 when the retainer described below is in its locked position.

The free end of shaft 10 terminates in an axially-facing end face 50 and an eccentric 52 is secured to the shaft 10 by a pivot pin 54 so that its axially-facing bearing face 56 facingly abuts end face 50. Eccentric 52 has an axially-facing free end face 58 opposite from the bearing face 56 and has a circular outer periphery which is preferably slightly smaller in diameter than the free end land 20 of shaft 10. The circular periphery of eccentric 52 is also preferably knurled to provide a gripping surface for an operator.

In the preferred embodiment, pivot pin 54 is a shoulder cap screw which is threaded into hole 60 in end face 50 so that its shoulder abuts shoulder 62 of hole 60, with its shank 55 countersunk into end face 50 in a close fit so as to react against bending loads which pivot pin 54 is subjected to. A thread adhesive such as Loctite TM is preferably used in hole 60 to prevent pin 54 from backing out of hole 60.

Pivot pin 54 is co-axial with pivot axis 64 which is offset from the shaft axis 11 and parallel thereto. Pivot pin 54 is preferably received in bore 66 of eccentric 52 with its cap head 68 countersunk therein. As such, pivot pin 54 secures eccentric 52 so that it is axially fixed to drive shaft 10 but is rotatable relative to drive shaft 10 about pivot axis 64.

Eccentric 52 also has a threaded bore 70 which defines a plunger axis 72 which is offset from the pivot axis 64. A hand retracted spring biased plunger 74 has a housing 76 which is threaded into 70 with the housing 76 extending slightly beyond bearing face 56. The housing 76 has a flange 78 which seats against a countersink in the free end 58 of eccentric 52. The plunger 74 also has a plunger shaft 77 having a locking end 79 and an operator end 80 which is preferably knurled for easy gripping by an operator. A spring inside the housing 76 (spring not shown) biases the plunger shaft 77 toward the drive shaft 10. Hand retracted spring plungers such as the plunger 74 are commercially available under the commercial designation SSL-520P from Vlier, Burbank, Calif.

The end of the housing 76 which extends beyond the bearing face 56 is received in a kidney-shaped slot 82 which is formed in the end face 50 of shaft 10. The slot 82 is arcuate about pivot axis 64 so that the eccentric 52 may be rotated about pivot axis 64 with the end of the housing 76 riding in the slot 82 until the housing 76 abuts an end of the slot 82. In this manner, the ends of the slot 82 provide pivot stops for the eccentric 52.

When the housing 76 abuts the left end of the slot 82 as shown in FIG. 4, the eccentric 52 is in an unlocked position in which it does not overlap the flange 18 of bearing 14 so that the shaft 10 and eccentric 52 can be drawn through the bearing 14. When the housing 76 abuts the right end of the slot 82 as shown in FIG. 5, the bearing face 56 of eccentric 52 overlaps flange 18 of bearing 14 so that shaft 10 cannot be drawn out of the drive bore 41. Note in this regard that the arc as measured from the drive shaft axis subtended by the overlapping area of the eccentric 52 over the bearing 14 should be greater than the arc subtended by any depressions or slots in the bearing 14 such as slot 84 so that the eccentric 52 cannot ride down into any such depression or slot as the shaft rotates relative to the bearing 14.

To secure the eccentric 52 in the unlocked position, a bore 86 is formed adjacent to the left end of the slot 82 into which locking end 79 of plunger shaft 77 is biased and engages when the locking end 79 is aligned with the bore 86. The operator end 80 may be grasped by an operator and the plunger shaft 77 pulled out of locking bore 86 to disengage the eccentric 52 from the unlocked position and pivot it to the locked position shown in FIG. 5, in which the locking end 79 is received in a locking bore 88 which is adjacent to the right side of the slot 82. When the locking end 79 is received in the locking bore 88, the eccentric 82 is positively secured in the locked position. This is important to note since the bearing face 56 of eccentric 52 may slide over flange 18 of bearing 14 when drive shaft 10 is rotated, which imparts frictional forces on the eccentric 52 which, depending upon the drive direction, may tend to rotate eccentric 52 toward the unlocked position. In the preferred embodiment, the eccentric 52 is rotated 30 degrees or other angle as necessary about pivot axis 64 between the locked and unlocked positions.

Referring to FIG. 6, a second embodiment of the invention is disclosed. This embodiment is identical to the previously described embodiment, except that the slot 84 extends for 30 degrees in both directions from the unlocked position and a second locking bore 90 is provided at the left end of the slot 84 so that the eccentric 52 may be rotated in either direction from the unlocked position and locked into a locking position.

Figure 7:
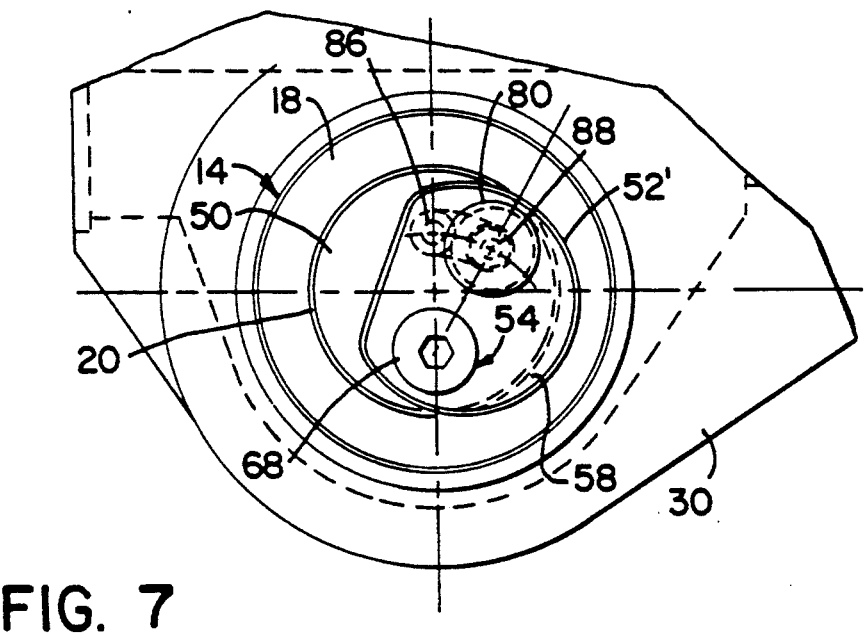
FIG. 7 is a view similar to FIG. 5 but showing an eccentric of an alternate shape.

Referring to FIG. 7, a third embodiment is disclosed. This embodiment is the same in all respects as the first embodiment described above, except that the flange 18 does not have a slot 84 and the eccentric 52' is not cylindrical. Instead, the eccentric 52' is in the form of a truncated cylindrical shape. Other shapes could also be used. However, making the eccentric 52 cylindrical is preferred because the cylindrical shape performs a guiding function as the shaft 10 is inserted into the drive bore 41 and also the symmetrical shape helps the eccentric 52 react against axial loads exerted on the eccentric by the flange 18.

Embodiments of the invention have been described above in considerable detail. Many modifications and variations will be apparent to those of ordinary skill in the art. For example, the invention could be practiced with a drive shaft having other than a spline connection with the drive head, such as for example, a drive shaft having a hex connection for driving engagement by the drive head. Therefore, the invention should not be limited to the preferred embodiments described, but should be defined by the claims, which follow.

I claim:

1. In a retainer for a hydraulic torque wrench drive shaft of the type having a bearing co-axial with and journalling a free end of said shaft, said shaft having an axially facing end-face adjacent to said bearing, an improvement comprising:

an eccentric having a bearing end surface in facing abutment with said end face of said shaft and a free end surface on the opposite side of said eccentric from said bearing end surface;

wherein said eccentric has a pivot axis and a plunger axis, said pivot and plunger axes being parallel to said shaft axis and said pivot axis being spaced apart from said shaft axis;

a plunger secured to said eccentric co-axial with said plunger axis, said plunger extending beyond said bearing and free end surfaces of said eccentric from a locking end which is beyond said bearing end surface to an operator end which is beyond said free end surface;

a pivot pin having an axis co-axial with said pivot axis pivotally connecting said shaft and said eccentric so that said eccentric is axially fixed to said shaft and rotatable between a locked position in which said eccentric bearing surface extends beyond an edge of said shaft end face and overlaps said bearing and an unlocked position in which said eccentric does not overlap said bearing;

wherein said shaft has at least one axially facing hole in said end face into which said plunger locking end can be engaged in said locked position of said eccentric, said plunger being releasable so as to rotate said eccentric to said unlocked position so that said eccentric can be drawn axially into said bearing.

2. The improvement of claim 1, wherein said eccentric has a circular outer periphery which is approximately equal to or less than the diameter of said free end of said shaft.

3. The improvement of claim 1, wherein an outer periphery of said eccentric has a knurled surface.

4. The improvement of claim 1, wherein said end face of said shaft has a second axially facing hole formed therein in which the locking end of said plunger engages in said unlocked position of said eccentric.

5. The improvement of claim 1, wherein the eccentric can be rotated to either of two locked positions on either side of said unlocked position.

6. The improvement of claim 1, wherein said plunger is spring biased toward said shaft.

7. The improvement of claim 1, wherein said pivot pin is a shoulder bolt having a shank which is countersunk into said end face of said shaft.

8. The improvement of claim 1, wherein a kidney shaped slot is formed in the end face of said shaft and the ends of said kidney shaped slot act as pivot stops to limit the rotary movement of said eccentric relative to said shaft.

9. The improvement of claim 8, wherein said axially facing hole in said end face opens into a bottom wall of said kidney shaped slot.

10. The improvement of claim 8, wherein a second axially facing hole is formed in the end face of said shaft into which the locking end of said plunger engages in the unlocked position of said eccentric and both of said axially facing holes open into a bottom wall of said kidney shaped slot.

11. The improvement of claim 8, wherein said plunger includes a housing which is fixed to said eccentric and extends beyond the bearing surface of said eccentric into said kidney shaped slot to abut the ends of said slot to limit rotary movement of said eccentric relative to said shaft.

* * * * *